United States Patent
Gorantla et al.

(10) Patent No.: US 12,106,155 B2
(45) Date of Patent: Oct. 1, 2024

(54) SYSTEM AND METHOD FOR PERFORMING PREEMPTIVE SCALING OF MICRO SERVICE INSTANCES IN CLOUD NETWORK

(71) Applicant: JPMorgan Chase Bank, N.A., New York, NY (US)

(72) Inventors: Chandra Gorantla, Sugar Land, TX (US); Aswani Dammalapati, Katy, TX (US)

(73) Assignee: JPMORGAN CHASE BANK N.A., New York, NY (US)

( * ) Notice: Subject to any disclaimer, the term of this patent is extended or adjusted under 35 U.S.C. 154(b) by 465 days.

(21) Appl. No.: 17/645,088

(22) Filed: Dec. 20, 2021

(65) Prior Publication Data

US 2023/0195532 A1 Jun. 22, 2023

(51) Int. Cl.
G06F 9/50 (2006.01)
G06F 11/34 (2006.01)
G06N 20/00 (2019.01)

(52) U.S. Cl.
CPC ............ G06F 9/5055 (2013.01); G06F 9/505 (2013.01); G06F 9/5072 (2013.01); G06F 11/3433 (2013.01); G06N 20/00 (2019.01)

(58) Field of Classification Search
CPC ........ G06F 9/50; G06F 9/5005; G06F 9/5055; G06F 9/5061; G06F 9/5077
See application file for complete search history.

(56) References Cited

U.S. PATENT DOCUMENTS

| 11,762,709 | B2* | 9/2023 | Wigglesworth | G06N 5/04 718/104 |
| 11,863,614 | B2* | 1/2024 | Kannadassan | H04L 67/1027 |
| 2023/0140272 | A1* | 5/2023 | Thoemmes | G06F 9/5083 713/2 |

* cited by examiner

Primary Examiner — Andy Ho
(74) Attorney, Agent, or Firm — GREENBLUM & BERNSTEIN, P.L.C.

(57) ABSTRACT

A method for performing preemptive scaling is disclosed. The method includes monitoring of incoming data volume outside of a cloud network at a node upstream from the cloud network, and identifying micro services required for processing of the incoming data volume. The method further includes determining a number of instances for each of the identified micro services, and contemporaneously creating the determined number of instances for each of the identified micro services in the cloud for processing of the incoming data volume.

20 Claims, 7 Drawing Sheets

SYSTEM AND METHOD FOR PERFORMING PREEMPTIVE SCALING OF MICRO SERVICE INSTANCES IN CLOUD NETWORK

TECHNICAL FIELD

This disclosure generally relates to a system and method for performing an early detection of a sudden influx of incoming data volume directed to a cloud network, and preemptively scaling instances of micro services in the cloud network for processing of the incoming data volume.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Presently, auto scaling performed in a cloud network may not be able to generate required number of instances quickly enough to meet a sudden influx in data processing demand, when millions of requests are received contemporaneously causing many requests to fail before the necessary instances are generated to perform data processing. In an example, a large organization may process millions of records at certain times, and many times, throughout a single day. The large influxes of data may be sent to a cloud network for processing in bursts, rather than in a steady flow of cases. More specifically, a large volume of records may be provided to the cloud network for processing for a period of time, followed by a lull where minimal or no processing is performed.

When a large number of records arrive at the cloud network for processing by various micro services residing therein, a native auto scaling operation may determine a number of records arriving at the cloud network using a load balancer, determine required micro service instance for processing the received records, determine sufficiency in the number of instances of the required micro service for processing the received records, and build one instance of the required micro service based on the determinations at a time. In other words, a single instance of a micro service is fully generated before another one can be generated. This process is repeated for each instance of a micro service required until a total number of required micro service instances are built. Each micro service instance may take 1 or more minutes to establish. Based on the amount of time required for establishing a micro service instance, there is a relatively low limit on the amount of records that may be processed through a cloud network at a given moment. When the amount of records exceeds such a limit, many of the records may go unprocessed or fail. However, building of a more robust cloud network with many more instances to handle peak demand will lead to wasted or inefficient utilization of technical resources (e.g., CPU and memory).

SUMMARY

According to an aspect of the present disclosure, a method for performing preemptive scaling is provided. The method includes monitoring of incoming data volume outside of a cloud network at a node upstream from the cloud network; identifying micro services required for processing of the incoming data volume, the micro services residing within the cloud network; determining a number of instances for each of the identified micro services; establishing a connection with the cloud network; requesting the cloud network to generate the determined number of instances for each of the identified micro services; generating the determined number of instances for each of the identified micro services, in which multiple instances of the identified micro services are generated contemporaneously; and performing data processing of the incoming data volume via the generated instances of the identified micro services.

According to another aspect of the present disclosure, the method further includes verifying completion of the data processing of the incoming data volume; requesting the cloud network to scale down by removing the generated instances of the identified micro services; and removing the generated instances of the identified micro services to free up computing resources.

According to another aspect of the present disclosure, the determining of the number of instances for each of the identified micro services includes: determining a minimum number of instances for each of the identified micro services; and determining a total number of instances for each of the identified micro services.

According to yet another aspect of the present disclosure, the data processing is performed once the minimum number of instances for each of the identified micro services is generated.

According to another aspect of the present disclosure, the data processing is performed upon generating the minimum number of instances for each of the identified micro services while instances for each of the identified micro services is continued to be generated until the total number of instances for each of the identified micro services is generated.

According to a further aspect of the present disclosure, the method further includes generating an initial set of micro service instances based on an artificial intelligence or machine learning algorithm before the monitoring of incoming data volume.

According to yet another aspect of the present disclosure, the initial set of the micro service instances is added to the determined number of instances for each of the identified micro services.

According to a further aspect of the present disclosure, the identifying micro services required for processing of the incoming data volume is performed using an artificial intelligence or machine learning algorithm.

According to another aspect of the present disclosure, the determining of the number of instances for each of the identified micro services is performed using an artificial intelligence or machine learning algorithm.

According to a further aspect of the present disclosure, the removing of the generated instances of the identified micro services is performed gradually based on a remaining data load of the incoming data volume.

According to a further aspect of the present disclosure, the cloud network includes a predetermined number of instances of the micro services residing within the cloud network.

According to a further aspect of the present disclosure, the cloud network includes a predetermined number of instances of the micro services residing within the cloud network, and the cloud network retains the predetermined number of instances of the micro services after the removing of the generated instances of the identified micro services.

According to a further aspect of the present disclosure, different numbers of instances are generated for at least two micro services among the identified micro services.

According to a further aspect of the present disclosure, a same number of instances are generated for the identified micro services.

According to another aspect of the present disclosure, the method further includes measuring a data load amount, in which the number of instances for each of the identified micro services determined using the artificial intelligence or machine learning algorithm is adjusted based on the measured data load amount of the incoming data volume.

According to another aspect of the present disclosure, the initial set of micro service instances is generated further based on a time of a day.

According to another aspect of the present disclosure, the incoming data volume fluctuates throughout a day with differing data load amount.

According to another aspect of the present disclosure, an influx of data volume is followed by minimal data volume for a period of time, and the minimal data volume does not require generated instances of the identified micro services for processing.

According to another aspect of the present disclosure, a system for performing preemptive scaling is disclosed. The system includes at least one processor; at least one memory; and at least one communication circuit. The at least one processor is configured to: identify micro services required for processing of the incoming data volume, the micro services residing within the cloud network; determine a number of instances for each of the identified micro services; establish a connection with the cloud network; request the cloud network to create the determined number of instances for each of the identified micro services; create the determined number of instances for each of the identified micro services, in which multiple instances of the identified micro services are created contemporaneously; and perform data processing of the incoming data volume via the created instances of the identified micro services.

According to another aspect of the present disclosure, a non-transitory computer readable storage medium that stores a computer program for performing preemptive scaling is disclosed. The computer program, when executed by a processor, causing a system to perform a process including monitoring of incoming data volume outside of a cloud network at a node upstream from the cloud network; identifying micro services required for processing of the incoming data volume, the micro services residing within the cloud network; determining a number of instances for each of the identified micro services; establishing a connection with the cloud network; requesting the cloud network to generate the determined number of instances for each of the identified micro services; generating the determined number of instances for each of the identified micro services, in which multiple instances of the identified micro services are generated contemporaneously; and performing data processing of the incoming data volume via the generated instances of the identified micro services.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
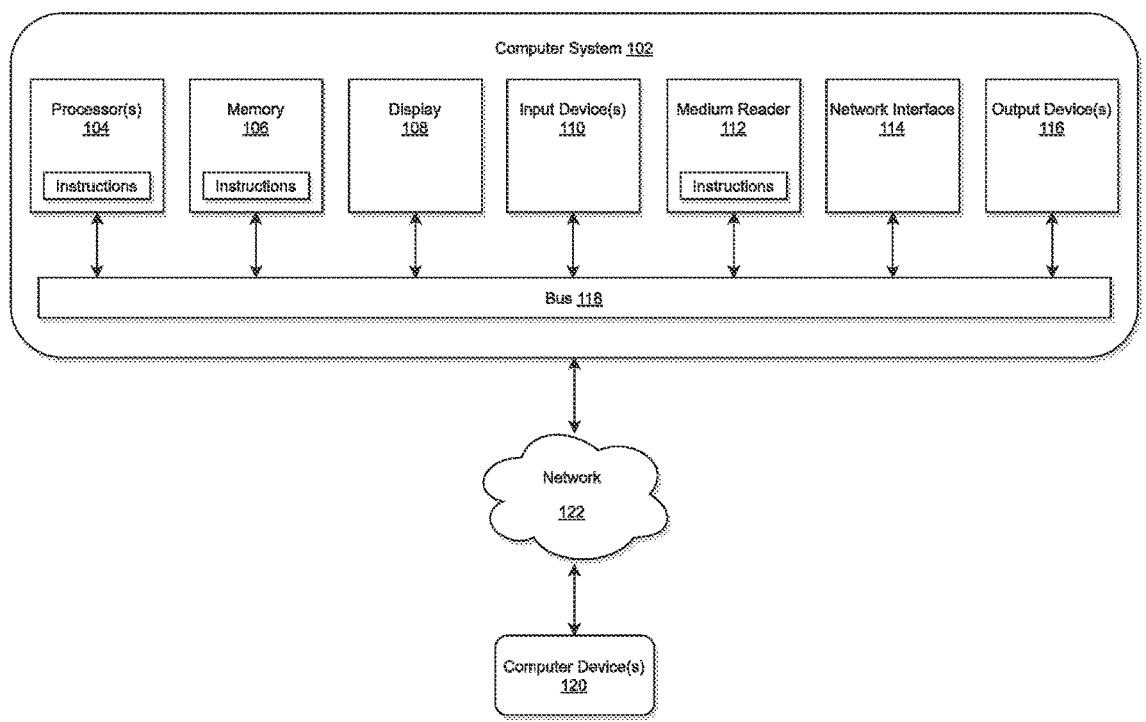
FIG. 1 illustrates a computer system for implementing an early scaling detection system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing an early scaling detection system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
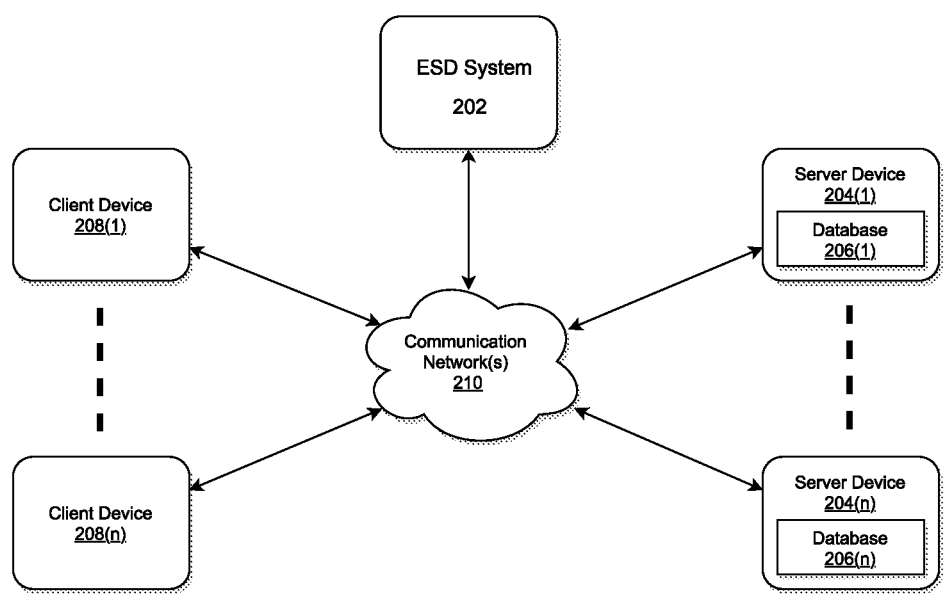
FIG. 2 illustrates an exemplary diagram of a network environment with an early scaling detection system in accordance with an exemplary embodiment.

FIG. 2 illustrates an exemplary diagram of a network environment with an early scaling detection system in accordance with an exemplary embodiment.

An early scaling detection (ESD) system 202 may be the same or similar to the computer system 102 as described with respect to FIG. 1.

The ESD system 202 may store one or more applications that can include executable instructions that, when executed by the ESD system 202, cause the ESD system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the ESD system 202 itself, may be located in virtual server(s) running in a cloud-based computing environment rather than being tied to one or more specific physical network computing devices. Also, the application(s) may be running in one or more virtual machines (VMs) executing on the ESD system 202. Additionally, in one or more embodiments of this technology, virtual machine(s) running on the ESD system 202 may be managed or supervised by a hypervisor.

In the network environment 200 of FIG. 2, the ESD system 202 is coupled to a plurality of server devices 204(1)-204(n) that hosts a plurality of databases 206(1)-206(n), and also to a plurality of client devices 208(1)-208(n) via communication network(s) 210. A communication interface of the ESD system 202, such as the network interface 114 of the computer system 102 of FIG. 1, operatively couples and communicates between the ESD system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ESD system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ESD system 202 may be a standalone device or integrated with one or more other devices or apparatuses, such as one or more of the server devices 204(1)-204(n), for example. In one particular example, the ESD system 202 may be hosted by one of the server devices 204(1)-204(n), and other arrangements are also possible. Moreover, one or more of the devices of the ESD system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices **204(1)-204(*n*) in this example may process requests received from the ESD system 202 via the communication network(s) 210** according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices **204(1)-204(*n*) may be hardware or software or may represent a system with multiple servers in a pool, which may include internal or external networks. The server devices 204(1)-204(*n*) hosts the databases 206(1)-206** (*n*) that are configured to store metadata sets, data quality rules, and newly generated data.

Although the server devices **204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a master/slave approach, whereby one of the network computing devices of the server devices 204(1)-204(*n*)** operates to manage and/or otherwise coordinate operations of the other network computing devices.

The server devices **204(1)-204(*n*)** may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices **208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*)**.

According to exemplary embodiments, the client devices **208(1)-208(*n*) in this example may include any type of computing device that can facilitate the implementation of the ESD system 202** that may efficiently provide a platform for implementing a cloud native ESD module, but the disclosure is not limited thereto.

The client devices **208(1)-208(*n*) may run interface applications, such as standard web browsers or standalone client applications, which may provide an interface to communicate with the ESD system 202 via the communication network(s) 210 in order to communicate user requests. The client devices 208(1)-208(*n*)** may further include, among other features, a display device, such as a display screen or touchscreen, and/or an input device, such as a keyboard, for example.

Although the exemplary network environment 200 with the ESD system 202, the server devices **204(1)-204(*n*), the client devices 208(1)-208(*n*), and the communication network(s) 210** are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ESD system 202, the server devices **204(1)-204(*n*), or the client devices 208(1)-208(*n*), for example, may be configured to operate as virtual instances on the same physical machine. For example, one or more of the ESD system 202, the server devices 204(1)- 204(*n*), or the client devices 208(1)-208(*n*) may operate on the same physical device rather than as separate devices communicating through communication network(s) 210. Additionally, there may be more or fewer ESD systems 202, server devices 204(1)-204(*n*), or client devices 208(1)-208** (*n*) than illustrated in FIG. 2. According to exemplary embodiments, the ESD system 202 may be configured to send code at run-time to remote server devices 204(1)-204 (*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
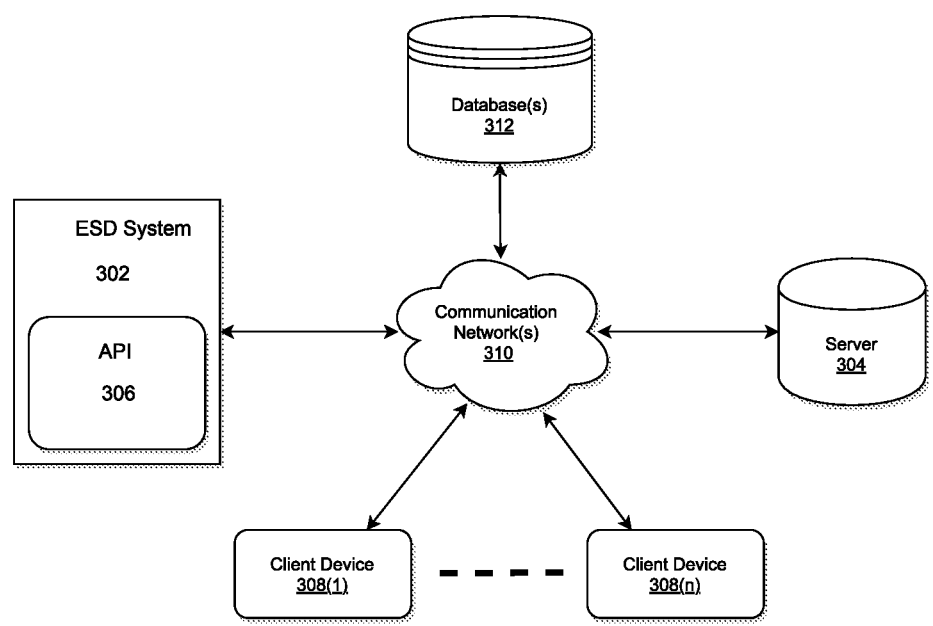
FIG. 3 illustrates a system diagram for implementing an early scaling detection system in accordance with an exemplary embodiment.

FIG. 3 illustrates a system diagram for implementing an early scaling detection system in accordance with an exemplary embodiment.

As illustrated in FIG. 3, the system 300 may include an ESD system 302 within which a group of API modules 306 is embedded, a server 304, a database(s) 312, a plurality of client devices **308(1) . . . 308(*n*), and a communication network 310**.

According to exemplary embodiments, the ESD system 302 including the API modules 306 may be connected to the server 304, and the database(s) 312 via the communication network 310. Although there is only one database has been illustrated, the disclosure is not limited thereto. Any number of databases may be utilized. The ESD System 302 may also be connected to the plurality of client devices **308(1) . . . 308(*n*) via the communication network 310**, but the disclosure is not limited thereto.

According to exemplary embodiment, the ESD system 302 is described and shown in FIG. 3 as including the API modules 306, although it may include other rules, policies, modules, databases, or applications, for example. According to exemplary embodiments, the database(s) 312 may be embedded within the ESD system 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices **308(1) . . . 308(*n*) via the communication network 310**.

The API modules 306 may be configured to implement a user interface (UI) platform that is configured to enable ESD as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the ESD system 302. In this regard, the plurality of client devices 308(1) . . . 308(n) may be "clients" of the ESD system 302 and are described herein as such. Nevertheless, it is to be known and understood that the plurality of client devices 308(1) . . . 308(n) need not necessarily be "clients" of the ESD system 302, or any entity described in association therewith herein. Any additional or alternative relationship may exist between either or both of the plurality of client devices 308(1) . . . 308(n) and the ESD system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the ESD system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The ESD system 302 may be the same or similar to the ESD system 202 as described with respect to FIG. 2, including any features or combination of features described with respect thereto.

Figure 4:
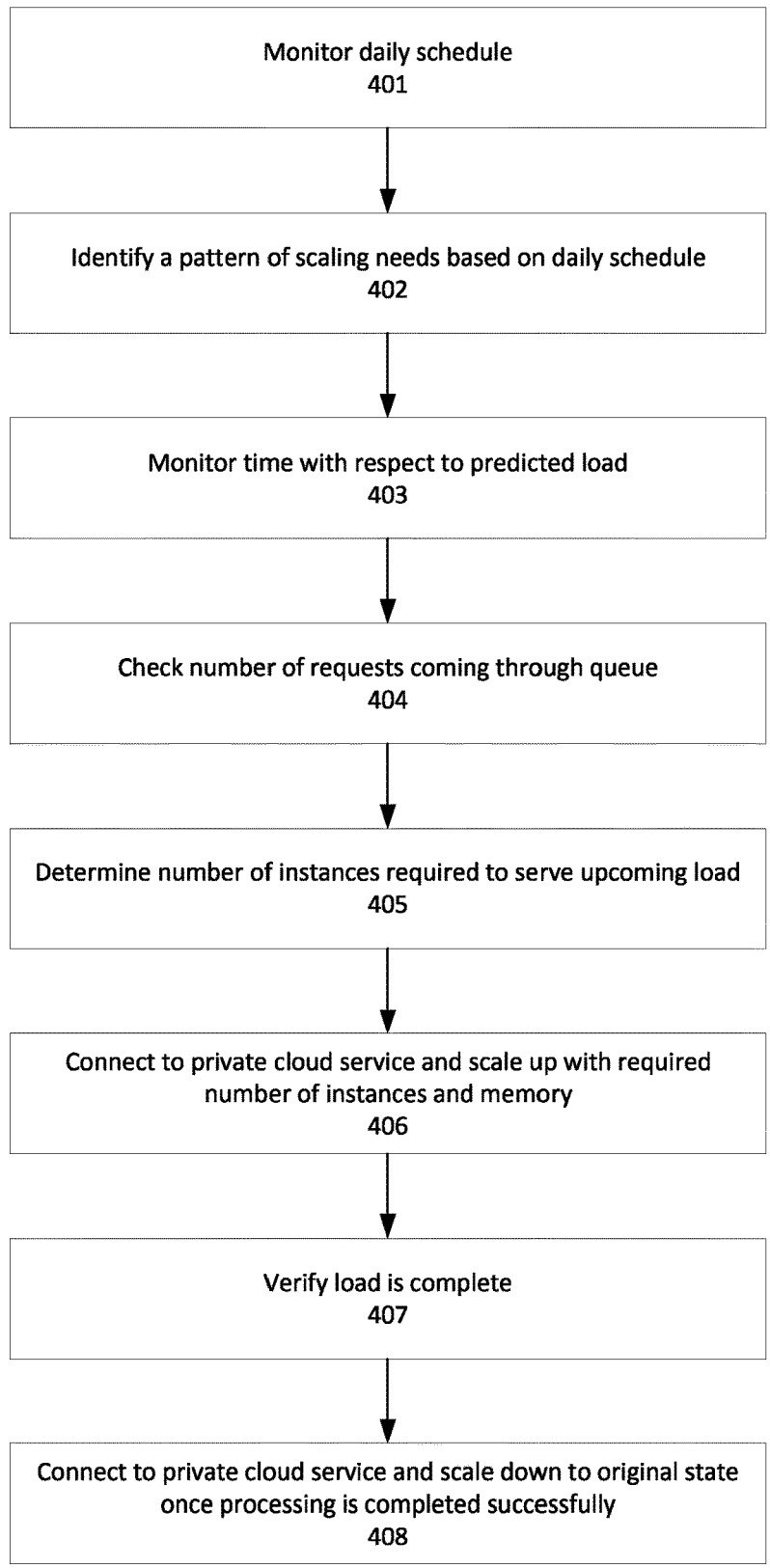
FIG. 4 illustrates a method for performing an early scaling operation in accordance with an exemplary embodiment.

FIG. 4 illustrates a method for performing an early scaling operation in accordance with an exemplary embodiment.

In operation 401, daily monitoring of incoming data volume for processing is performed. According to exemplary aspects, the incoming data volume may be directed to a cloud network for processing by one or more micro service instances established in the cloud network. In an example, the monitoring of the incoming data volume may be performed at one or more upstream nodes, which may directly or indirectly feed into the cloud network. The one or more upstream nodes may reside outside of the cloud network.

In an example, the data volume may fluctuate throughout the day, in which a large amount of data volume may come through in a short period of time to be followed by a lull before the next influx of data volume arrives for processing. For example, 20 million data records may be coming through a private cloud network in a span of 30 minutes or so. Further, the processing such data volume may also require pulling of approximately 50 million data points and applying various rules for providing of an output. The incoming data may be processed by one or more of micro service instances available on the cloud network. In an example, ten or so different micro services may be available. However, aspects of the present disclosure are not limited thereto, such that different numbers or types of micro services may be available. Based on the data volume processing needs, a preemptive scaling operation may be performed by adding additional instances of the micro services available in the cloud network for handling of the excess demand.

In operation 402, a pattern of scaling needs is identified based on a daily schedule. As exemplarily illustrated in FIG. 6, data volume feeding into the cloud network in a day may fluctuate throughout the day. For example, a large flux of data volume may be arriving at different times throughout the day from different countries. Data records from Asia may arrive during a certain time window, data records from Europe may arrive during a different time window, data records from South Africa may arrive during another time window and so on. Further, the data records arriving from different countries may vary in size. Based on the daily data volume schedule detected, a pattern of scaling needs, such as a minimum/total number of micro service instances required for processing of the incoming data volume, may be identified. The minimum/total number of micro service instances may be identified for each micro service identified as being needed for processing of the incoming data (e.g., micro service A, micro service B, micro service C and the like). In an example, the pattern of scaling may be performed for each batch or influx of data volume detected.

According to exemplary aspects, a volume of the incoming data may be actively tracked or predicted using one or more AI or ML algorithms. However, aspects of the present disclosure are not limited thereto, such that a combination of the two may be utilized. For example, initial incoming volume may be predicted using the one or more AI or ML algorithms to begin the initial creating or generating of micro services. Then the predicted incoming data volume may be adjusted based on the actual data volume measured, and the remaining instances of micro services may be generated based on the adjusted data volume information.

In an example, AI or ML algorithms may be executed to perform data pattern detection, and to provide an output based on the data pattern detection. More specifically, an output may be provided based on a historical pattern of data, such that with more data or more recent data, more accurate outputs may be provided. Accordingly, the ML or AI models may be constantly updated after a predetermined number of runs or iterations. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

In operation 403, monitoring of time with respect to a predicted load is performed. In an example, time of the day is monitored along with the predicted load. For example, for an international organization, data volume may be expected to be received at certain times of the day. For example, data records from Asia may be expected to arrive at time point A, whereas data records from Europe may be expected to arrive at time point B. Based on consistency of data arrival times and data volume amount, time data may be utilized to begin initializing creating of additional instances. Such analysis may be performed using one or more AI or ML algorithms. Further, monitoring of time with respect to the predicted load or actual load may indicate how much time is available for creating or generating of additional instances of the required micro services.

In operation 404, a number of requests coming through a queue is checked. In an example, a queue may include one or more upstream nodes, which may direct data traffic towards the cloud network for processing by its micro services. As the number of requests or data records pass through the queue, identities of the micro services required may be determined.

In operation 405, a number of instances for each of the identified micro services required to serve an upcoming load is determined. More specifically, based on the number of requests or data records coming through the queue and the identification of the data services required, amount of processing and memory capability is determined. Further, based on such determination, a number of instances for each of the required micro service instances is determined.

According to exemplary aspects, a default number of instances may be set at a minimal number to accommodate for load during non-peak times. As exemplarily illustrated in FIG. 6, it can be seen that for the majority of the time, amount of data volume to process may be minimal, and thus leaving much of the micro services to be in an idle state. Accordingly, having a large number of instances dedicated for handling influx of large data volume may lead to waste of technical resources (e.g., CPU, memory and the like) for nearly half of a day or more. On the other hand, given the drastic rise in data volume in a very short span of time, scaling has to be performed immediately or ahead of time to accommodate for the sudden rise in data volume in order to properly handle the sudden rise in data volume without loss of data or failure. If the scaling operation begins after reaching the private cloud level as conventionally done, insufficient number of instances may be available to handle the incoming data load and risk inability to process all of the incoming data volume.

In operation 406, a connection to a private cloud service is established to scale up with the required number of instances of the identified micro services and memory is established. Once the identification of the required micro services and the number of instances for each of the identified micro services are determined, a connection to the private cloud service may be established for requesting creation or generation of the additional instances of the identified micro services. For example, if there are three different micro services (e.g., micro service A, micro service B, and micro service C) that are identified as being required for performing data processing among ten micro services available, the required number of instances for each of the identified different micro services are generated. According to exemplary aspects, instances of the different micro services are created or generated contemporaneously. For example, instances of micro service A, micro service B, and micro service C may be created or generated contemporaneously, thus reducing time required for getting the instances of the required micro services running.

In operation 407, a load completion status is verified. Once all of the required micro services instances are generated, and the influx of data records have been processed, an operation may be performed to verify that the processing of the data volume or load has been completed. For example, the data volume or load may be determined to have been completed when all of the detected data volume has been processed. However, aspects of the present disclosure are not limited thereto, such that the data volume or load may be determined to be have been completed when the additional instances of micro services that were generated are no longer necessary, such that the remaining data may be processed with the default number of micro service instances.

In operation 408, a connection to the private cloud service is established to scale down to original state once processing is completed successfully. Once the load completion has been verified in operation 407, the connection to the private cloud service is once again established to remove all of the additional instances of the micro services that were generated to leave only the default number of micro service instances remaining. The scaling down operation in operation 408 may thereby free up unnecessary CPU and memory resources that will otherwise remain idle until the next influx of data volume arrives to the ESD system.

Figure 5:
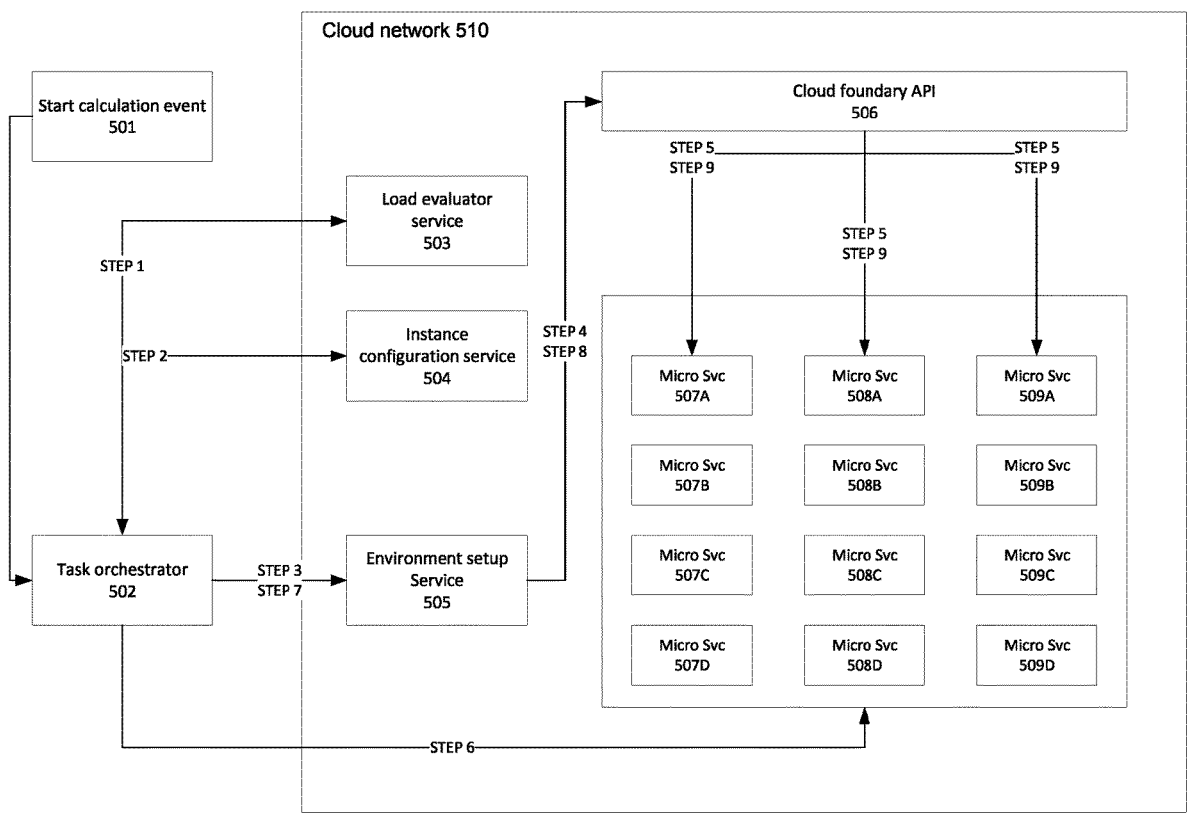
FIG. 5 illustrates a system for performing an early scaling operation in accordance with an exemplary embodiment.

FIG. 5 illustrates a system for performing an early scaling operation in accordance with an exemplary embodiment.

Start calculation event 501 is initiated. The start calculation event provides an input to a task orchestrator 502. In an example, the input may indicate an expected or a detected event at an upstream node, and the expected/detected event may increase a load to a cloud network 510. The cloud network 510 may be a private cloud network. In an example, the start calculation event 501 may be initiated outside of the cloud network 510 by the upstream node or computing/network device.

However, aspects of the present disclosure are not limited thereto, such that the start calculation event 501 may be initiated by an AI or ML algorithm, which may predict or calculate an amount of expected data that may be sent to the cloud network for processing. In an example, the AI or ML algorithm may perform such prediction or calculation by analyzing various sources of upstream data outside of the cloud network 510.

In step 1, the task orchestrator 502 may communicate with a load evaluator service 503 to notify the load evaluator service 503 of the expected event or corresponding load expected to arrive at the cloud network 510. The load evaluator service 503 may determine an amount of data load that may be directed to the cloud network 510. The information determined by the load evaluator service 503 is then transmitted to the task orchestrator 502. The load evaluator service 503 may reside in the cloud network 510. However, aspects of the present disclosure are not limited thereto, such that the load evaluator service 503 may reside outside of the cloud network 510.

In step 2, the task orchestrator 502 provides the information received in step 1 to an instance configuration service 504. The instance configuration service 504, in receipt of the information received from the task orchestrator 502, may determine or identify one or more micro services (e.g., micro service 507, micro service 508, micro service 509 and etc.) required for performing processing of the determined data load, and a number of instances for the required micro services. The micro services identified as being required for the data processing and the number of instances of the required micro services are then provided to the task orchestrator 502 for scheduling generation of the required number of micro services. The instance configuration service 504 may reside in the cloud network 510. However, aspects of the present disclosure are not limited thereto, such that the instance configuration service 504 may reside outside of the cloud network 510.

In an example, the number of required micro service instances may indicate a total number of micro service instances. The number of instances for the required micro services may also indicate a minimum number of instances of the required micro services to begin data processing. According to exemplary aspects, the minimum number of instances of the required micro services may indicate a minimum number for each of the micro services required (e.g., micro service 507, micro service 508, micro service 509 and the like). However, aspects of the present disclosure are not limited thereto, such that a minimum number of instances may be specified for one micro service and a total number of instances may be specified for another micro service. Moreover, the number of required instances may not always be static, but may adjust accordingly based on the amount of data to be processed at the cloud network 510. For example, when the data load expected is lighter, then all of the micro service instances may be able to be created or generated prior to processing the data load. On the other hand, if the data load expected is heavier, then the required number of micro service instances may specify a minimum number or a number than is less than the total required before processing of data may begin. However, aspects of the present disclosure are not limited thereto, such that the number of instances may be determined by one or more AI or ML algorithms to better utilize computing resources without risking failure of data processing.

In step 3, the task orchestrator 502 sends the identification of the micro services required for processing the detected data load or volume and corresponding number of instances of the required micro services to the environment setup service 505. The environment setup service 505 may specify a number of micro service instances required per each micro service identified as being required. The number of micro service instances required may indicate a total number or a minimum number. In an example, if the minimum number is specified, processing of the data load may be initiated once the minimum number of instances of the required micro services are created or generated. In such a situation, during processing of the data load, the remaining number of instances of the required micro services may be created or generated. The environment setup service 505 resides within the cloud network 510. However, aspects of the present disclosure are not limited thereto, such that the environment setup service 505 may reside outside of the cloud network 510.

In step 4, the environment setup service 505 coordinates with the cloud boundary API 506 for scaling up instances of the required micro services. For example, the environment setup service 505 may specify a number of micro service instances required for handling of the expected data load. For example, the environment setup service 505 may specify four instances of micro service 507 (i.e., micro service 507A, micro service 507B, micro service 507C, and micro service 507D) are required, four instances of micro service 508 (i.e., micro service 508A, micro service 508B, micro service 508C, and micro service 508D) are required, and four instances of micro service 509 (i.e., micro service 509A, micro service 509B, micro service 509C, and micro service 509D) are required. Although equal number of instances for the micro services are described herein, aspects of the present disclosure are not limited thereto, such that differing number of instances may be specified for the different micro services for data processing.

In step 5, the cloud boundary API 506 will create or generate the required number of micro service instances. According to exemplary aspects, instances of different micro services may be created contemporaneously. For example, an instance of a micro service 507, an instance of a micro service 508 and an instance of a micro service 509 may be created or generated contemporaneously. In contrast, conventional auto scaling may be limited to creation of one micro service instance at a time.

In step 6, once the required number of micro service instances are generated or created, the task orchestrator 502 may begin scheduling data processing at the cloud network 510 via the created instances of the micro service 507, micro service 508 and micro service 509. In an example, the required number of micro service instances may refer to a minimum number of micro service instances required to begin data processing, or a total number of the required micro service instances. However, aspects of the present disclosure are not limited thereto, such that the required number of instances for beginning data processing may be a number between the minimum number and the total number based on the data volume or amount to be processed.

In step 7, once all of the expected data have been processed via the generated instances of the required micro services, the task orchestrator 502 notifies the environment setup service 505 that the data processing has ended and instructs to begin scaling down of the micro service instances back down to the default number of micro service instances. In an example, the default number of micro service instances may refer to a number of micro service instances required in the cloud network 510 at all times, including during non-peak times.

In step 8, the environment setup service 505 coordinates with the cloud boundary API 506 for scaling down of the micro service instances. In an example, all of the extra instances of micro service instances that were created or generated during the scaling up operation may be deleted or removed from the cloud network 510. According to exemplary aspects, the scaling down operation may begin after all of the expected data have been processed. Alternatively, the scaling down operation may begin as the number of instances required for processing the remaining amount of the expected data is reduced as the data are being processed. In an example, the scaling down operation may be scaled down according to a predetermined schedule once an amount of remaining data to be processed is reduced to a threshold level.

In step 9, the cloud boundary API 506 will remove the number of micro service instances created during the scaling up operation. According to exemplary aspects, instances of different micro services that were created or generated during the scaling up operation may be removed or deleted contemporaneously. For example, an instance of a micro service 507, an instance of a micro service 508 and an instance of a micro service 509 may be removed or deleted contemporaneously.

Figure 6:
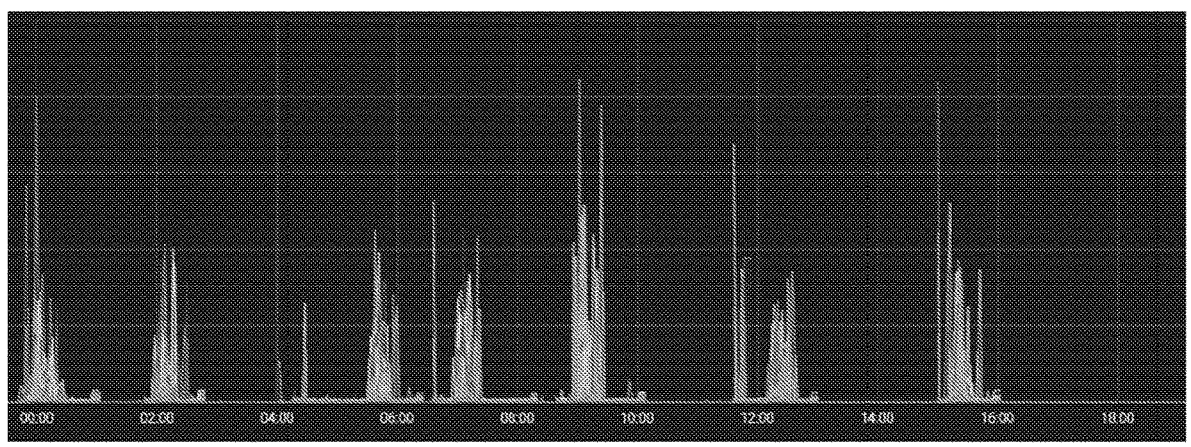
FIG. 6 illustrates an exemplary graph of daily scaling volume in accordance with an exemplary embodiment.

FIG. 6 illustrates a graph of daily scaling volume in accordance with an exemplary embodiment.

As illustrated in FIG. 6, sudden influxes of data volume may arrive into a private cloud network for performing processing by its resident micro services multiple times during a day. More specifically, a large data volume may flow into the private cloud network within a short period of time, which may be followed by a longer duration without much activity (i.e., a minimal data volume that may be processed by default instances of micro services without the help of the additional instances that were created or generated for processing the influx of data volume). The duration with minimal activity may be followed by another influx of data volume for processing. Such a pattern of a large influx of data volume followed by a lull in activity may occur several times throughout the day. Further, for each occurrence of data volume influx, amount and/or types of data may be different, which may require differing number instances and/or micro services. For example, an organization connected with various international data sources may receive influx of data for different country regions at different times during the day. Further, at least since the sources of data may not be homogeneous, differing micro services may be required for each occurrence of data influx.

Figure 7:
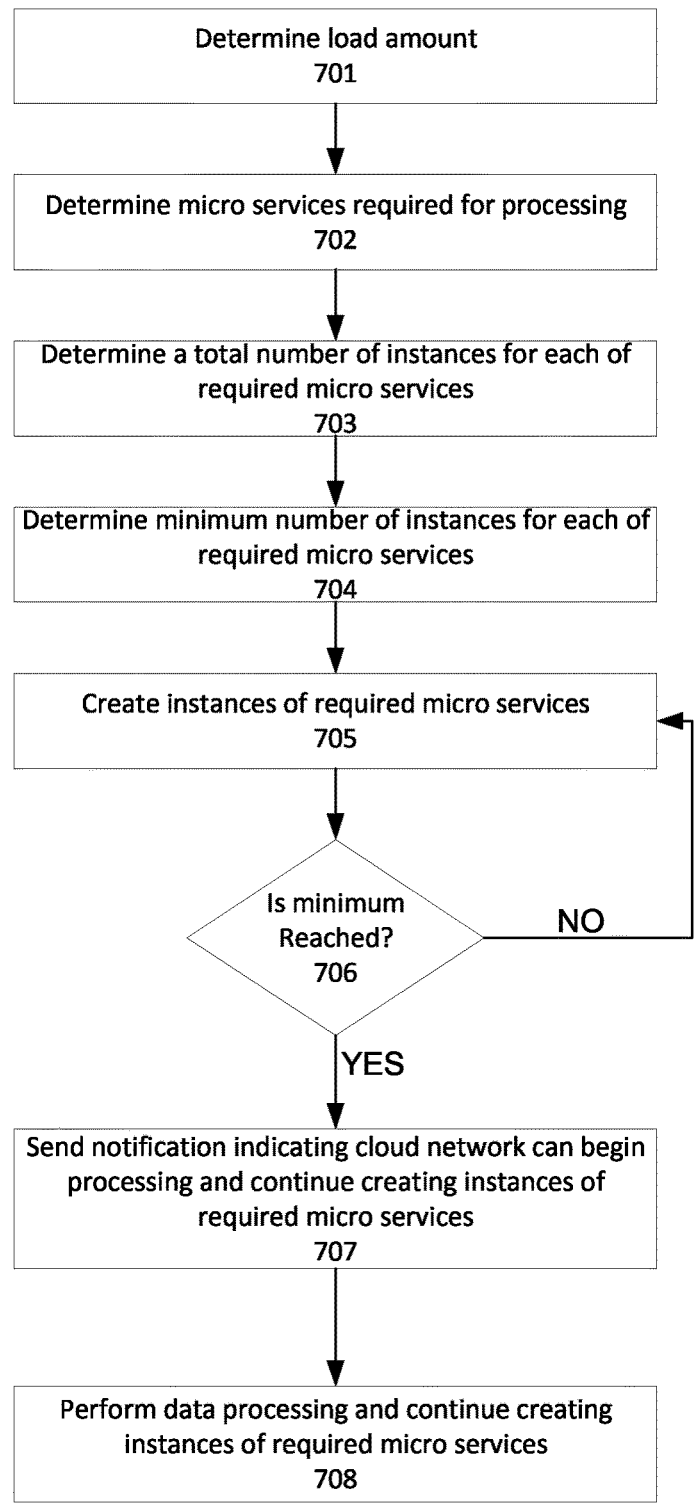
FIG. 7 illustrates a method for performing data processing upon detection of a minimum number of micro service instances in accordance with an exemplary embodiment.

FIG. 7 illustrates a method for performing data processing upon detection of a minimum number of micro service instances in accordance with an exemplary embodiment.

In operation 701, an incoming data volume or amount for processing is determined. The incoming data volume or amount may be directed to a private cloud network for processing by its resident micro services within a short period of time. For example, an influx of approximately 20 million records may be directed to the cloud network to be processed within 30 or so minutes. The incoming data volume or amount may be detected at an upstream node or a computing/network device before reaching the cloud network.

In operation 702, a determination of micro services required for processing of the incoming data volume or amount is made. Different micro services may be available in the cloud network. The micro services may be configured to perform different operations and/or may have differing attributes. In an example, ten or so micro services may be available in a cloud network for selection and utilization, and a select number of them may be identified for performing data processing. Some micro services may not be utilized. However, aspects of the present disclosure are not limited thereto, as all of the resident micro services may be utilized during data processing.

In operation 703, a number of instances for each of the micro services required for processing of the incoming data volume or amount is determined. Based on data processing needs, certain micro services may be utilized more heavily than others. For example, ten instances of micro service A may be determined to be necessary, whereas only five instances of micro service B may be determined to be necessary. However, aspects of the present disclosure are not limited thereto, such that same number of instances may be created for each of the micro services determined or identified for processing of the incoming data volume or amount.

In operation 704, a minimum number of instances for each of the required micro services is determined. For example, even if a total of ten instances of the micro service A is required, if data processing may be initiated without undue risk of not meeting processing requirements with only five instances of the micro service A, five instances may be determined to be a minimum number of instances of the micro service A. However, aspects of the present disclosure are not limited thereto, such that additional buffer may be added to the minimum number before data processing may be permitted or initiated. Also, for certain data volumes, for which the total number of instances may be created or generated before reaching the cloud network, the minimum number of instances may equal to the total number of instances.

In operation 705, instances of the required micro services are created or generated. According to exemplary aspects, instances of different micro services are created or generated contemporaneously. For example, an instance of micro service A, an instance of micro service B, and an instance of micro service C may be created or generated contemporaneously.

In operation 706, a determination of whether the minimum number of instances for each of the required micro services has been created or generated is performed. If the minimum number of instances has not yet been met, instances of the required micro services continue to be created in operation 705. On the other hand, if the minimum number of the required micro services has been created or generated, the method proceeds to operation 707.

In operation 707, a notification to a task orchestrator may be sent to inform the task orchestrator that the cloud network can begin processing the incoming data, and instances of the required micro services are continued to be created or generated until the total number of instances has been reached for each of the required micro services.

In operation 708, the incoming data are processed through the created instances of the required or identified micro services while the cloud network continues to create or generate instances of the required micro services until the total number of instances has been reached for each of the required micro services. According to exemplary aspects, as additional instances are created or generated, the created instances are immediately utilized for processing of the incoming data. Accordingly, processing capability gradually grows while data is being processed to increase processing speed and to reduce down time for maximizing throughput and utilization of technical resources, such as CPU and memory utilization.

Once the incoming data are processed, the additional instances of the required or identified micro services are removed or deleted for scaling down, such that unutilized CPU and memory resources may be redeployed elsewhere. In an example, the additional instances of the micro services that were created to handle the influx of data volume may be removed gradually as data load wanes, or they may be removed all at once after the incoming data volume is determined to have completed processing.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing preemptive scaling, the method comprising:
performing, using a processor and a memory:
monitoring of incoming data volume outside of a cloud network at a node upstream from the cloud network;
identifying micro services required for processing of the incoming data volume, the micro services residing within the cloud network;
determining a number of instances for each of the identified micro services;
establishing a connection with the cloud network;
requesting the cloud network to generate the determined number of instances for each of the identified micro services;
generating the determined number of instances for each of the identified micro services, wherein a plurality of instances of the identified micro services are generated contemporaneously; and
performing data processing of the incoming data volume via the generated instances of the identified micro services.

2. The method according to claim 1, further comprising:
verifying completion of the data processing of the incoming data volume;
requesting the cloud network to scale down by removing the generated instances of the identified micro services; and
removing the generated instances of the identified micro services to free up computing resources.

3. The method according to claim 1, wherein the determining of the number of instances for each of the identified micro services includes:
determining a minimum number of instances for each of the identified micro services; and
determining a total number of instances for each of the identified micro services.

4. The method according to claim 3, wherein the data processing is performed once the minimum number of instances for each of the identified micro services is generated.

5. The method according to claim 4, wherein the data processing is performed upon generating the minimum number of instances for each of the identified micro services while instances for each of the identified micro services is continued to be generated until the total number of instances for each of the identified micro services is generated.

6. The method according to claim 1, further comprising generating an initial set of micro service instances based on an artificial intelligence or machine learning algorithm before the monitoring of incoming data volume.

7. The method according to claim 6, wherein the initial set of the micro service instances is added to the determined number of instances for each of the identified micro services.

8. The method according to claim 1, wherein the identifying micro services required for processing of the incoming data volume is performed using an artificial intelligence or machine learning algorithm.

9. The method according to claim 1, wherein the determining of the number of instances for each of the identified micro services is performed using an artificial intelligence or machine learning algorithm.

10. The method according to claim 2, wherein the removing of the generated instances of the identified micro services is performed gradually based on a remaining data load of the incoming data volume.

11. The method according to claim 1, wherein the cloud network includes a predetermined number of instances of the micro services residing within the cloud network.

12. The method according to claim 2, wherein the cloud network includes a predetermined number of instances of the micro services residing within the cloud network, and
wherein the cloud network retains the predetermined number of instances of the micro services after the removing of the generated instances of the identified micro services.

13. The method according to claim 1, wherein different numbers of instances are generated for at least two micro services among the identified micro services.

14. The method according to claim 1, wherein a same number of instances are generated for the identified micro services.

15. The method according to claim 9, further comprising measuring a data load amount,
wherein the number of instances for each of the identified micro services determined using the artificial intelligence or machine learning algorithm is adjusted based on the measured data load amount of the incoming data volume.

16. The method according to claim 6, wherein the initial set of micro service instances is generated further based on a time of a day.

17. The method according to claim 1, wherein the incoming data volume fluctuates throughout a day with differing data load amount.

18. The method according to claim 17, wherein an influx of data volume is followed by minimal data volume for a period of time, and
wherein the minimal data volume does not require generated instances of the identified micro services for processing.

19. A system for performing preemptive scaling, the system comprising:
at least one processor;
at least one memory; and
at least one communication circuit,
wherein the at least one processor is configured to:
monitor incoming data volume outside of a cloud network at a node upstream from the cloud network;
identify micro services required for processing of the incoming data volume, the micro services residing within the cloud network;
determine a number of instances for each of the identified micro services;
establish a connection with the cloud network;
request the cloud network to create the determined number of instances for each of the identified micro services;
create the determined number of instances for each of the identified micro services, wherein a plurality of instances of the identified micro services are created contemporaneously; and
perform data processing of the incoming data volume via the created instances of the identified micro services.

20. A non-transitory computer readable storage medium that stores a computer program for performing preemptive scaling, the computer program, when executed by a processor, causing a system to perform a process comprising:
monitoring of incoming data volume outside of a cloud network at a node upstream from the cloud network;
identifying micro services required for processing of the incoming data volume, the micro services residing within the cloud network;

determining a number of instances for each of the identified micro services;
establishing a connection with the cloud network;
requesting the cloud network to create the determined number of instances for each of the identified micro services;
creating the determined number of instances for each of the identified micro services, wherein a plurality of instances of the identified micro services are created contemporaneously; and
performing data processing of the incoming data volume via the created instances of the identified micro services.

* * * * *